Patented Aug. 20, 1940

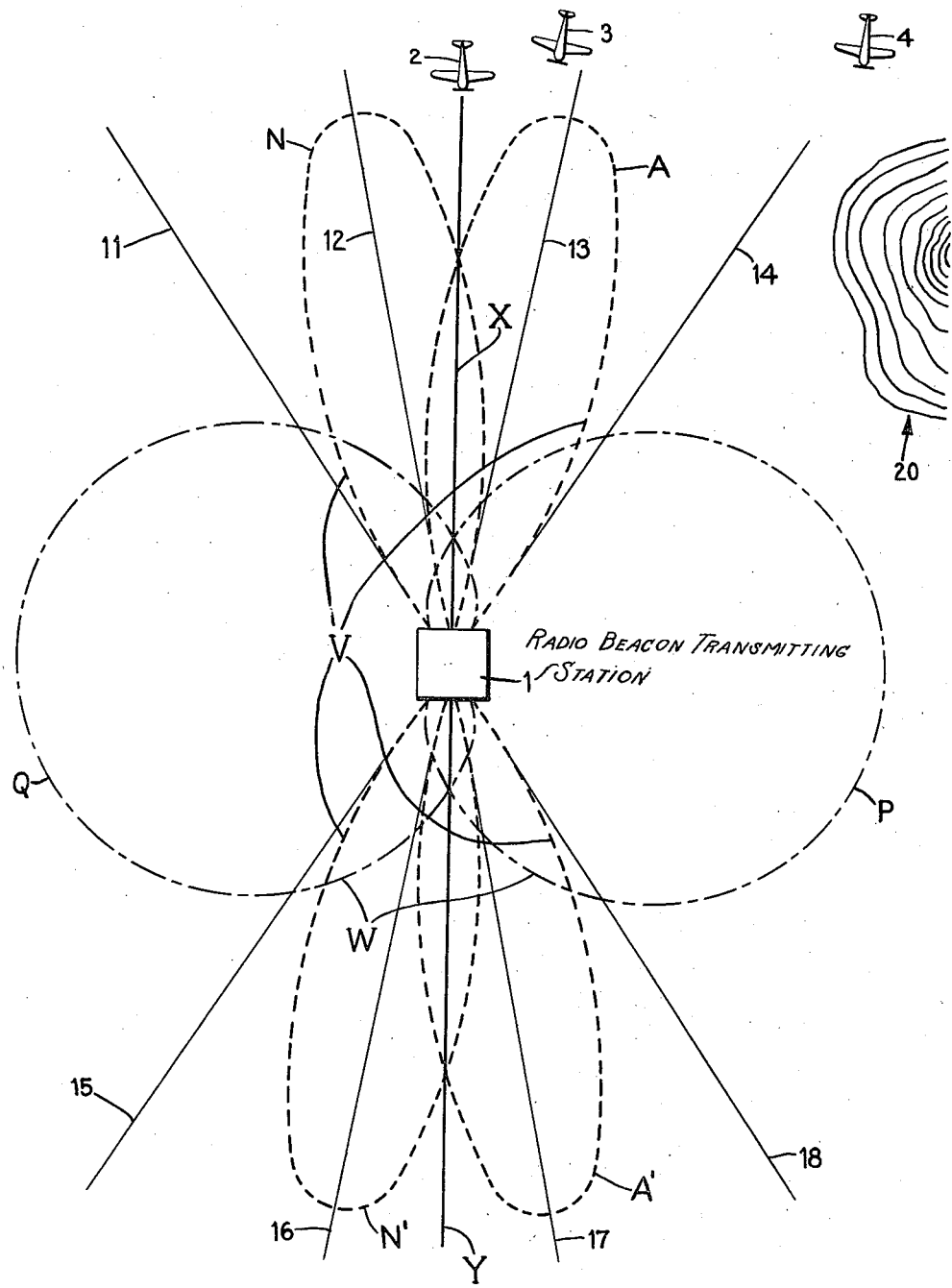

2,212,238

UNITED STATES PATENT OFFICE 2,212,238

ULTRA SHORT WAVE COURSE BEACON

Frederick A. Kolster, Garden City, N. Y., assignor to International Telephone Development Co. Inc., New York, N. Y., a corporation of Delaware Application June 11, 1938, Serial No. 213,161

3 Claims. (Cl. 250—11)

The present invention relates to a new method for guiding aircraft and other craft along a predetermined course by means of course signals transmitted by radio-waves from a fixed point and received by the aircraft or other craft. In its broader aspects the invention relates to an entire radio range system and to a method of guiding aircraft or other craft. In its narrower aspects the invention relates to radio beacon transmitters and to receiving equipments for receiving the indications of such radio beacons.

It is an object of my invention to provide a course indicating system in which the course indicating signals shall be less subject to objectionable disturbances, and in which the received course indication will be not only more precise and definite but also substantially more free from spurious course lines and split or double indications than in the case of previously known systems. In particular it is an object of the present invention to provide a course indicating system and a method of giving course indications which shall reduce spurious course indications or indefinite course indications resulting from the reflection or refraction of the transmitted waves by surrounding obstacles such as mountains, man-made structures, or zones of non-homogeneous transmission or refraction in the surrounding medium. It is a further object to provide a signal pattern for guiding aircraft which shall be not only free from spurious indications and other similar errors resulting from refraction or reflection, and inherently more precise than the indications given by prior art methods and systems, but which shall also uniformly indicate like geographical deviations from course (e. g. eastward deviations) by means of like signals (e. g. "A" keyed signals) regardless of whether the craft are approaching or leaving the beacon or are north or south of the center of the pattern.

It is a further object of my invention to provide a system in which a reflection-free and refraction-free course indication of inherently high precision and definiteness is transmitted to craft in the immediate neighborhood of the correct course, and in which also an indication is transmitted to craft more remote from the correct course in order to indicate the general sense of their deviation from the correct course.

According to the preferred form of my invention, I contemplate using ultra-short waves for transmitting the radio beacon indications or at least for transmitting the narrow-angle radiation which serves to indicate the exact desired course. Such ultra-short waves have many advantages as compared with the longer waves generally used for radio beacon signals, but such short waves may be expected to be subject to still more objectionable effects resulting from the reflection of the radiated patterns by surrounding obstacles such as mountains or man-made structures. Accordingly it is a further object of my invention to provide a method of guiding aircraft and other craft by means of ultra-short wave signals; and in particular it is an object to provide a method and means for guiding aircraft and other craft by means of ultra-short wave signals confined within a narrow angle, while at the same time providing indications receivable over a wider angle to serve aircraft at a considerable angular deviation from the correct course.

In accordance with the present invention, the directional pattern transmitted from a radio course indicating beacon comprises two separate and distinguishable course indicating component patterns, one of which is sharply directional so as to provide a precise indication of the exact course to be followed, and furthermore is concentrated within a comparatively narrow angle so as to be receivable only within a comparatively narrow zone, whereas the other component pattern is radiated over a wider effective angle so as to be receivable in a wider zone. The first mentioned radiation which is hereinafter referred to as the primary radiation, is more narrowly concentrated, and is used to provide an accurate course indication for guiding the airplane or other craft exactly on the desired course, and because of its comparatively narrow effective angle this radiation is less susceptible to errors due to reflection from extraneous obstacles and thus provides a more reliable and precise course indication. The more widely radiated component which is hereinafter referred to as the supplementary radiation, serves to provide a rough or approximate indication to an airplane or other craft which has strayed a considerable distance from the desired course, in order to enable the craft to ascertain in which general direction it should proceed in order to regain the desired course. At the same time, if any of the supplementary radiation should be reflected or refracted by obstacles, this cannot affect the accuracy of the primary signals because the primary and secondary signals are in accordance with my invention, clearly characterized by some suitable distinctive characteristic such as frequency, modulation, or keying, so that reflected waves of the supplementary radiation cannot simulate the primary radiation.

The exact nature of my invention can best be understood by reference to the accompanying single figure of the drawing, which schematically represents a beacon signal transmitting station in accordance with my invention, and the radiation pattern transmitted therefrom. Referring more particularly to the figure of drawing, I schematically represents a signal transmitting station adapted to produce two separate radiant patterns designated generally as W and V respectively, and respectively represented in the drawing by the dot-dash and broken-line curves of equal field strength. The line X represents the desired course direction for craft on one side of the transmitting station, and the line Y the desired course direction for craft on the other side of the station. For convenience it may be assumed that the line X extends north of the station and the line Y extends south of the station. Three aircraft equipped with receivers for receiving the signals transmitted from station I are represented at 2, 3 and 4 respectively. For convenience of illustration, each of these aircraft has been shown outside of the equal-field-strength lines, which have been chosen to represent the radiation pattern, but it will be understood that these equal-field-strength lines represent merely the boundary within which the field-strength is equal to or greater than a certain arbitrarily selected threshold, and thus the field-strength at points outside of these equal-field-strength boundary lines, although it is lower than the arbitrarily selected threshold represented by these lines, is still amply above the limit of useful reception. The value of the field-strength at points outside of the illustrated boundary lines may be approximately determined in accordance with the inverse square law in known manner.

The narrow-angle radiation pattern generically designated as V, comprises four principal lobes A, N, A' and N' symmetrically disposed about the axis X, Y so that along the axis X the field-strength resulting from lobe A is equal to the field-strength resulting from lobe N, and along the line Y the field-strengths from A' and N' are likewise equal. In accordance with the preferred form of my invention, the lobes A and A' represent signals modulated in accordance with the Morse code letter A, while the lobes N and N' represent signals modulated in accordance with the Morse code letter N. Preferably the coded modulations, or Morse code keyings of these signals, are complementary. Thus along the course lines X and Y these complementary key modulations interlock to form a continuous dash in known manner, so that an aircraft flying exactly along the predetermined course will hear only a series of continuous dashes, but will not hear either the Morse code A nor the Morse code N. The lines 11, 12, 13, 14, 15, 16, 17 and 18 represent the angular limits of the radiation lobes N, A, N' and A', the radiation of lobe N being bounded between lines 11 and 13, the radiation of lobe A being bounded between lines 12 and 14, the radiation of lobe N' being bounded between lines 15 and 17, and the radiation of lobe A' being bounded between lines 16 and 18. Thus in the region between lines 14 and 18 and in the region between lines 11 and 15, no signals will be heard resulting from the radiation pattern V, except for possible weak secondary lobes which are here neglected. Similarly in the region between lines 11 and 12, lines 13 and 14, lines 15 and 16, and lines 17 and 18, the only received signals from the radiation pattern V will be either the Morse letter N or the Morse letter A, but not both. In the central zones between lines 12 and 13, or between lines 16 and 17, both the A signal and the N signal will be received but generally with unequal intensity in order to indicate that the airplane is not exactly on course. Finally, upon the course lines X and Y the signals will merge into a continuous dash as explained above.

The reference numeral 20 indicates an obstacle such as a mountain which is assumed to be located to one side of the desired flight course, and preferably beyond the line 14. Since none of the energy from radiation pattern V is directed toward this obstacle 20, it will be apparent that there can be no reflection or refraction of any energy from the radiation pattern V, so that the possibility of course-line distortion or spurious on-course indications is thereby completely eliminated. Even if the obstacle 20 extends within the angular zone 13—14, it will be clear that only the A-keyed signals will be reflected or refracted by this obstacle provided the obstacle does not extend within the angle 11—13. Thus if there are no other obstacles within the region 11—14 or the region 15—18, the system will still be substantially free from badly distorted on-course indications or split indications and will be wholly free from the possibility of producing a spurious "on course" signal in the region east of the line 13. This will be clear if it is noted that at most the obstacle 20 can only reflect or refract the A-keyed signals of radiation pattern V so as to either weaken or strengthen these signals, but cannot in any way effect the strength of the N-keyed signals of radiation pattern V. Thus it will be clear that if the radiation pattern V is concentrated within a sufficiently narrow angle so that there are no large obstacles within the angle 11—14 or the angle 15—18, the system will be completely free from distorted or spurious on-course indication and will also give an accurate and undistorted quantitative measure of the extent of deviation from the desired course within the angle 11—14. Furthermore, even if one or more obstacles do extend within the angle 11—14, the method and system of the present invention will provide signals which are far less subject to distorted or spurious on-course indication than the systems and methods previously known. It is contemplated to confine the pattern V within an angle of 30° and preferably with an angle of 15° where great fredom from distortions is important. But some advantage may be obtained even if the angle of each lobe is as great as 45°.

In accordance with the preferred form of my invention, ultra short waves having a wavelength of 2 to 10 meters are employed for the radiation pattern V. Such ultra short waves lend themselves unusually well to sharply directional radiation and provide a particularly definite and precise on-course indication with comparatively low transmitter power. Such ultra short waves, however, are particularly subject to reflection and refraction from obstacles of comparatively moderate dimensions, and therefore if such ultra short waves were used for aircraft guiding beacons in accordance with the methods and systems previously known, the errors and dangers resulting from spurious and distorted on-course indications and distorted indications of the degree of off-course deviation would be so great as to render the system impracticable. In accordance with my invention, however, the use of such ultra short waves is rendered not only practicable but also totally unobjectionable, so that the advantages of such ultra short waves may be obtained without any corresponding disadvantge.

As explained above, within the angular region 14—18 and 11—15 there will be substantially no radiation from the radiation pattern V. In many applications, especially where the angles 11—14 and 15—18 are made narrow to avoid obstacles, the absence of signals in the zones 14—18 and 11—15 would be objectionable since it might often occur that aircraft would find themselves outside of the effective signal region of the beacon. This would be particularly likely to occur in the case of temporary interruption of service by static or by failure of the beacon signals or of the receiving equipment or where the navigator had failed to read the signals for some time or in the case of aircraft which had approached within a few miles of the beacon while navigating in accordance with signals received from some other beacon. In order to obviate such difficulties I propose as an example of a further feature of my invention, to provide a further radiation pattern W which shall either be concentrated into a less narrow angle than the radiation pattern V, or preferably not concentrated within a limited angular zone at all. Such auxiliary radiation pattern W may, if desired, also be arranged to comprise two or more paths which are respectively keyed according to the usual A—N coding, and which may also interlock so as to provide an on-course indication in the same general manner as the radiation pattern V. It is preferred, however, to arrange the auxiliary pattern W so that this auxiliary pattern will merely give a general indication of the fact that the aircraft is considerably off its course and will indicate in which direction the craft has deviated without attempting to provide a further off-course indication. Therefore, in accordance with the preferred form of my invention, the auxiliary pattern W consists of two lobes such as P and Q which do not greatly overlap each other but which together cover substantially the whole field of 360° around the transmitting station. As shown, each of the lobes P and Q is effective over approximately 180° so that in any region to the right of the on-course line X, Y there will be some signal from P, whereas in any region to the left of X, Y there will be some signal from Q. It is, of course, not necessary that the lobes P and Q should cover the whole 360° range around the transmitting station since it will clearly be sufficient if these lobes P and Q adequately cover the zones 14—18 and 11—15 with a reasonable amount of overlap to insure against dead spots between the zones covered by the lobes P and Q and the zones covered by the radiation pattern V.

According to the preferred form of my invention, the auxiliary radiation pattern W is constituted by signals of the same frequency as the signals which constitute the radiation pattern V, the two lobes P and Q being alternately keyed according to the same A—N code used for pattern V, but the two radiation patterns are modulated with different audio-frequency modulations. If, for example, a frequency of 100 megacycles is used for both the pattern V and the pattern W and these two patterns are modulated in accordance with audio frequency tones of 500 cycles per second and 2000 cycles per second, respectively, and are simultaneously and synchronously keyed with the same keying codes A and N, the navigator of an aircraft will be able to distinguish the signals from each other at all times without possibility of confusion since their tones will be strikingly different. At the same time the convention which must be remembered with respect to right and left deviation from the exact desired course will be simplified since in each case the letter N and the letter A will have the same significance. Furthermore, by the use of such an arrangement, which is preferred in accordance with my invention, the same receiver can be used for both signals without change in tuning. A tuned audio frequency filter may readily be provided for eliminating the undesired signal W when it is desired to use only the narrow-angle signal V. Yet at the same time, if it is desired to receive both signals simultaneously, as when passing from the zone 14—18 to the zone 11—14, the pilot can readily listen to both signals without confusion because of their marked difference in tone.

For transmitting the two separate radiation patterns V and W, it is preferred to use two separate antenna arrays. The array for transmitting the radiation pattern V may, for example, comprise eight or more V antennae depending upon the sharpness of the angle required for this radiation pattern V. Each of the four lobes A, N, A' and N' may be produced by two V antennae disposed in known manner so as to produce a relatively sharp front lobe with substantially no back lobe and with only minor side lobes. The two V antennae which produce the lobe A and the two V antennae which produce the lobe A' may be connected together for simultaneous energization, and similarly the four V antennae which produce the lobes N and N' may also be connected together for simultaneous energization, the keying being such that the energization of lobes N and N' correspond to the spaces between the energization of lobes A and A' so as to produce interlocking A and N signals.

The antenna structure for producing the pattern W is preferably separate from the antenna structure for producing the pattern V. The antenna structure for the pattern W may in its simplest form comprise two separate antenna arrays each adapted to produce a cardioid shaped lobe such as P or Q, each of these arrays being designed in known manner, and the two arrays being alternately keyed to produce A-coded modulations of the lobe P and N-coded modulations of the lobe Q. Preferably the A-coded and N-coded modulations of the lobes P and Q are not quite complementary so that the keyings do not interlock to form a continuous dash along the course line X, Y. Thus there will be no temptation for the pilot to employ the less accurate course indication of the pattern W in place of the more precise and reliable course indication of the pattern V. The coded key modulations of the lobes P and Q of pattern W may either overlap or preferably may be made shorter than the true complementary lengths so that even along the central axis of the pattern the signals resulting from the two lobes P and Q will form an intermittent signal in place of a continuous dash. So far as possible, moreover, the individual cardioid patterns P and Q should be designed to provide only a very slight field strength along the course line X, Y, thus further discouraging the navigator from employing the course indication of the pattern W in place of the course indication of the pattern V. For this purpose the radiation patterns of the cardioids P and Q may be modified by additional reflectors which may either be antennae, parasitic or fed, or may be large conducting screens which reflect in quasi-optical manner.

According to the preferred form of my invention, the antenna structure for the pattern W, instead of comprising two complete cardioid-producing arrays as above described, comprises three vertical dipoles of which the center one is fed and the other two are alternately made effective to act as parasitic reflecting dipoles. Thus the antenna arrays for lobes P and Q in part coincide, and only three dipoles are required for the complete pattern W.

According to the preferred form of my invention, moreover, the same radio frequency is used for both the pattern W and the pattern V, and one common radio frequency generator serves for energizing both antenna structures. Thus in addition to the equipment needed for producing the pattern V, the only additional equipment required for the pattern W comprises three vertical dipole antennae and a separate audio frequency modulator and keying apparatus.

In some cases, moreover, the antenna arrays used for the lobes A, A', N and N' may coincide in part. It should be noted, however, that it is preferred in every case to cancel the back radiation from lobe N in so far as this back radiation tends to fall on top of the lobe A' and to similarly cancel the back radiation from lobe A in so far as this back radiation tends to fall on top of the lobe N'. This preferred arrangement enables all the N-keyed signals to be maintained on one side of the course line and all the A-keyed signals to be maintained on the other side of the course line, thus preventing the confusion which sometimes arises from the use of quadrantally arranged radiation signals. It is, however, possible to employ the back radiation of lobe N for lobe A' and the back radiation of lobe A for lobe N', but in this case the lobe A' will be keyed with Morse code N and the lobe N' will be keyed with Morse code A, thus requiring a change in conventions when the aircraft passes over the beacon. In case this arrangement is employed, the pattern W is preferably keyed with an entirely separate set of codes which will not tend to be associated in the navigator's mind with the codes used for the pattern V, so as to minimize the confusion.

Although the preferred form of my invention employs audio frequency modulations to distinguish the signals of pattern V and pattern W, a nearly similar result could also be obtained by modulating the two signals at different super-audible frequencies and providing a heterodyne stage in the receiver of each of the aircraft to reduce the two modulations to the same or preferably different audible tones. It is also possible to apply modulations at different super-audible frequencies together with further modulations at the same or different tone frequencies, but it is preferred to arrange the system so that the actual indications given to the pilot will be different for the two signals in every case, so that there will be no possibility of confusion between the signals in case the navigator fails to notice to which signal the receiving set is tuned.

Alternatively instead of, or in addition to using different audible or super-audible modulations in order to prevent confusion between the signals of radiation pattern W and the signals of radiation pattern V, the signals of the pattern W may be keyed at different speeds or in accordance with different codes from the signals of the narrow radiation pattern V. Furthermore, the signals of the auxiliary radiation pattern W may be of a slightly different frequency or even of an entirely different order of frequency from the signals of the principal radiation pattern V. In this case, two separate receivers may be provided for simultaneously receiving both sets of signals, or alternatively, one receiver may be provided which is adapted to be selectively tuned to the different frequencies. In any case, the signals of pattern V should be different in respect of some characteristic (such as frequency, modulation tone, or keying rhythm) from the signals of pattern W, so that reflections of the latter pattern cannot affect the signals of pattern V.

Although certain embodiments of my invention have been described for purposes of illustration, it will be understood that modifications, adaptations and variations thereof occurring to one skilled in the art may be made within the scope of my invention as defined in the appended claims.

What is claimed is:

1. A guiding beacon comprising means for radiating two radiation patterns in overlapping relation, said two patterns being confined substantially to a narrow angular zone, means for imparting a distinctive signal characteristic to each of said radiation patterns, whereby a course line is defined by the overlapping portions of said patterns, means for radiating two other radiation patterns in overlapping relation, said other patterns extending over an angular zone embracing said limited angular range and extending outside said limited angular zone, and means for imparting a distinctive signal to each of said two other patterns whereby large angular deviations from said course are indicated.

2. A beacon according to claim 1, wherein said means for imparting distinctive signal characteristics, first mentioned, comprises means for producing complementary code signals in each of said first named radiation patterns.

3. A beacon according to claim 1, wherein said first and second mentioned means imparting distinctive signals comprises means for keying said radiation patterns to produce complementary code signals, means for modulating said first two radiation patterns with a modulating frequency, and means for modulating said two other radiation patterns at a different modulating frequency.

FREDERICK A. KOLSTER.